United States Patent

Paaskesen

[15] 3,636,858
[45] Jan. 25, 1972

[54] TOASTER

[72] Inventor: Julius Barclay Estrup Paaskesen, Naverland 17-19, 2600 Glostrup, Denmark

[22] Filed: June 29, 1970

[21] Appl. No.: 50,454

[30] Foreign Application Priority Data

July 22, 1969 Denmark................................3950/69

[52] U.S. Cl..............................99/335, 99/329 RT, 99/391
[51] Int. Cl. ......................................................A47j 37/08
[58] Field of Search..............99/329 RT, 335, 334, 337, 338, 99/327, 389, 391, 393

[56] References Cited

UNITED STATES PATENTS

| 1,720,800 | 7/1929 | Morrison | 99/391 X |
| 1,852,398 | 4/1932 | Bersted | 99/335 |
| 1,942,835 | 1/1934 | Rutenber | 99/335 |
| 2,465,577 | 3/1949 | Cox | 99/335 X |
| 3,229,613 | 1/1966 | Matzenauer | 99/327 |

*Primary Examiner*—Billy J. Wilhite
*Attorney*—Kemon, Palmer & Estabrook

[57] ABSTRACT

A toaster having a vertically orientated toasting compartment with a hinged cover a hinged bottom which during a toasting operation is held in a horizontal position by means of a pawl. The pawl is withdrawn to discharge the toasted bread by means of a tripping device controlled by an adjustable timing device which thus determines the toasting period. Means are provided for operatively connecting the bottom, the cover and the timer so that lifting of the cover causes the bottom to be lifted to horizontal position and locked by the pawl and the timing device to start when the cover is subsequently closed. After the period of the timing device has run out, it actuates the tripping device to release the compartment bottom.

9 Claims, 4 Drawing Figures

PATENTED JAN 25 1972

INVENTOR

Julius B. E. Paaskesen

BY Kemon, Palmer & Estabrook

ATTORNEYS

TOASTER

BACKGROUND OF THE INVENTION

This invention relates to a toaster having a casing including a vertical bread compartment with apertured sidewalls, heating elements disposed adjacent said sidewalls outside of said compartment, and a compartment bottom hingedly connected to the casing for pivoting between a horizontal position in which bread may be supported thereon within said compartment, and a downwardly inclined position, a pawl for holding said bottom in said horizontal position and a timing device arranged for releasing the pawl.

A toaster of this kind known from U.S. Pat. No. 1,852,398 comprises a toasting compartment which is open at its top, and separate manually operable means for starting the timing device and for lifting the bottom of the toasting compartment to its operative horizontal position, when it has previously been released by the timing device.

SUMMARY OF THE INVENTION

According to the present invention there is provided a toaster comprising a casing including a vertical bread compartment with apertured sidewalls, heating elements disposed adjacent said sidewalls outside of said compartment, a cover hingedly connected to said casing to close the upper end of said compartment during a toasting operation, a compartment bottom hingedly connected to said casing for pivoting between a horizontal position in which bread may be supported thereon within said compartment, and a downwardly inclined position, a pawl for holding said bottom in said horizontal position, a timing device, releasing means operatively connecting said timing device with said pawl to release the pawl when the timer has run out, tie means connecting said cover with said bottom so that lifting of said cover causes the bottom to be lifted into its horizontal position, said tie means including a lost-motion device, and means connected to said tie means for activating said timing device when said cover is lifted.

As compared to the above-discussed known toaster, the operation of a toaster according to the invention is simplified, since it only involves that for each toasting operation, the cover has to be lifted, so that a batch of bread slices, buns or the like can be placed in the toasting compartment, whereafter the cover is reclosed. As soon as the cover has been lifted, it is ensured that the bottom assumes its horizontal position and is locked by the pawl, and due to the lost-motion or play in the tie means between the cover and the bottom, the latter may remain horizontal when the lid is closed. Consequently, there is only one member, such as a handle or knob on the cover, which must be manually operated in order to control all internal functions of the toaster. This is of particular value when the toaster is used for toasting small breads, so-called buns or rolls which are sold together with hamburgers, frankfurters or the like, in which case one operator will have to attend both to the toasting of the buns and the selling of the hamburgers, etc.

The cover and the bottom may be connected by means of a first tie rod which is hinged directly to one of the parts and which has an oblong slot into which a pin fixed to the other part engages. The required lost motion between the movements of the cover and the bottom is thus established in a simple manner.

The first tie rod may be hinged to the cover, and a second tie rod may be hinged thereto and provided with an oblong slot in which a pin engages, which is fixed to a tripping arm for the bottom retaining pawl. By using two separate tie rods connecting the cover to the retaining pawl and to the compartment bottom, respectively, a rather wide choice in the dimensioning of the component parts and their respective movements is provided.

The tripping arm may be spring loaded for disengaging the retaining pawl and, in this case, the timing device may be designed as a simple espacement. By employing a strong spring for acting upon the tripping arm, the spring is able, at the same time, to act as motive force for the timing device which, in this manner, can be constructed particularly simply and inexpensively.

A try may be fitted below the compartment bottom for receiving and accommodating the toasted bread, and the tray may be provided with a cover hinged at its front edge. Between the front and rear edges of the tray cover there may be provided at least one additional hinge joint. When the toaster is operated intermittently, the cover may then be kept closed, whereby the warm toast is protected against drying out and the said hinging of the cover provides the possibility of opening and closing same without pulling the tray completely out.

The rear edge of the tray cover may be provided with a lug which, in the closed position of the cover, extends downwards, whereby the free edge of the cover may be suspended by means of the lug on the front edge of the tray in the open position.

DETAILED DESCRIPTION

Figure 1:
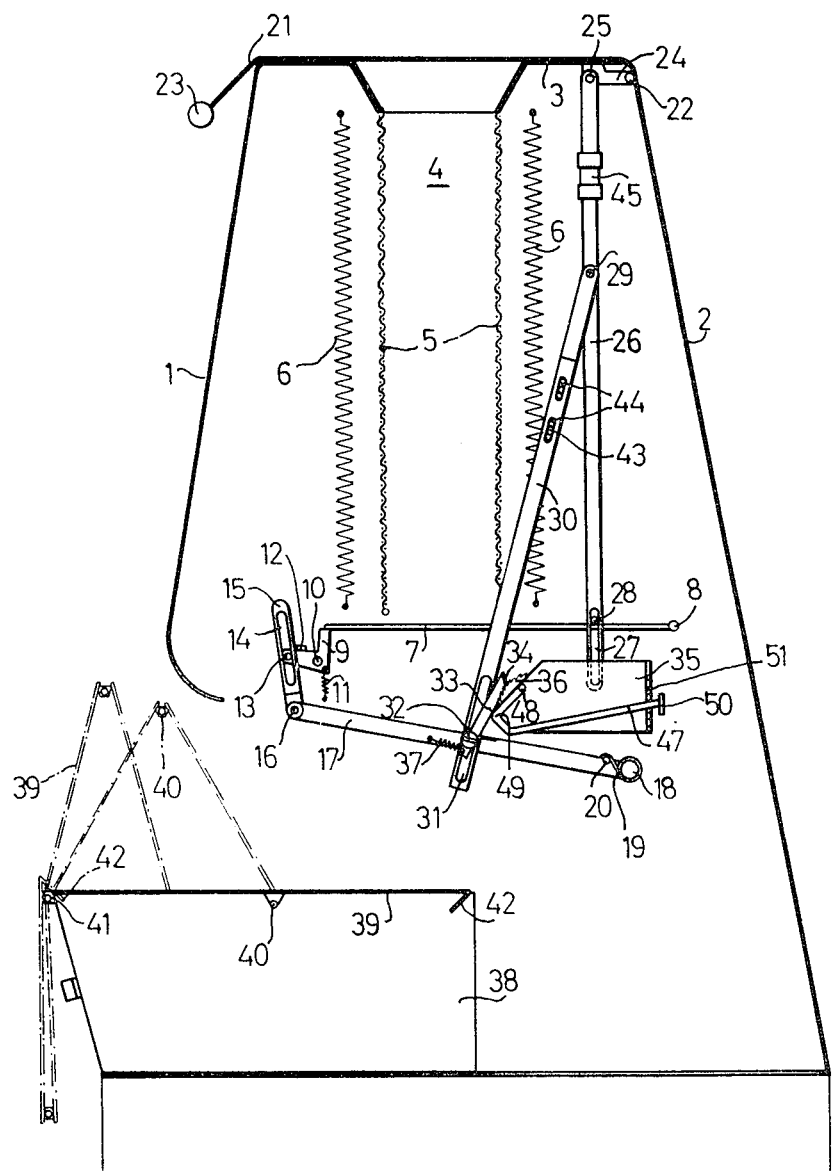
FIG. 1 shows schematically a cross section through an embodiment of the toaster according to the invention with its parts in the positions they assume at the beginning of a toasting operation.

The toaster illustrated in the drawings has a casing or housing comprising a front wall 1, a rear wall 2, a top wall 3 and two end walls, not shown in detail. The top wall 3 has a central opening leading to a vertical compartment 4 which serves to accommodate the bread slices or buns to be toasted and which in the lateral direction, is delimited by two grids 5. In the casing, on the sides of the grids 5 remote from the compartment 4, there are heating elements schematically shown as electrical incandescent coils 6, the radiant heat of which, through the grids 5, brings about the toasting of the bread.

The bottom of the compartment 4 is formed by a bottom plate 7 which is pivotal about a horizontal hinge shaft or pin 8 situated in the proximity of the rear wall 2. In the course of a toasting operation, the bottom plate 7 is kept in its position shown in FIG. 1 by means of a retaining pawl 9 constructed as a bellcrank lever, which is rotatable around a pivot pin 10 and is spring loaded clockwise by means of a spring 11. In its extreme position shown in FIG. 1, the pawl 9 engages a fixed stop 12, which may, for instance, be fitted to one end wall of the casing.

A pin 13 is secured to the retaining pawl 9 and guided in an oblong slot 14 in a bar 15 which, by means of a hinge joint 16 is rotatably connected to a tripping arm 17 which is pivotal on a horizontal shaft 18. A torsion spring 19 coiled around the stationary shaft 18 is, at one end, secured to the shaft and the other end of the spring engages a pin 20 on the tripping arm 17, which is thereby biased counterclockwise as seen in FIG. 1.

Figure 4:
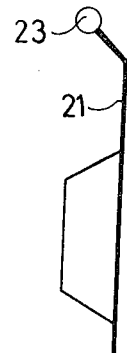
FIG. 4 is a section on a larger scale along the line IV—IV of FIG. 3.
Figure 4:
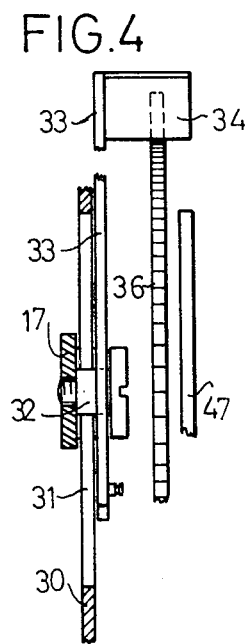

The bread compartment 4 is, at the top, closed by a cover 21 which can be pivoted upwards about hinge pins 22 at the uppermost end of the rear wall 2. The cover 21 is moved manually by means of a handle 23 fixed to its front edge. A hinge bracket 24 secured to the rear edge of the cover is, at 25, pivotally connected with a tie rod 26 which, at its lowermost end, has an oblong slot 27 wherein a pin 28 secured to the bottom plate 7 engages. A further tie rod 30 is hingedly connected to an intermediate point 29 of the tie rod 26. The tie rod 30 has, at its lowermost end, an oblong slot 31, wherein a pin 32 fixed to the tripping arm 17 engages. In the embodiment shown, the pin 32 is a screw which is threaded into the arm 17, vide also FIG. 4. The pin 32 serves, moreover, as an axis of rotation for a short arm 33 which extends parallel to the rod 30, its uppermost end being, however, angled to form a ratchet 34.

A timing device designated by 35 is, in a manner not shown in detail, fixed to the casing of the toaster, for example, to one end wall thereof, and the timing device has an output wheel 36 with ratchet teeth, with which the ratchet 34 is adapted to engage. The engagement between the ratchet 34 and the wheel 36 normally is ensured by means of a tension spring 37 between the tripping arm 17 and the arm 33. The torsion spring 19 acting upon the arm 17 produces the requisite motive power for the timing device 35 which, consequently, may be merely a simple espacement comprising one or more rotating shafts with brakes, such as airbrakes, serving to limit and determine the possible rotational velocity of the output wheel 36 under the influence of the spring 19. An anchor espacement provided with weights may be used as a delaying means.

In the bottom of the toasting casing, underneath the mechanisms described above, a tray 38 for receiving and accommodating the toasted bread is provided. The tray 38 which, in a manner not shown, can be guided relative to the casing so that it can be pulled out therefrom, has a cover 39 which is hingedly connected to the front edge of the tray 38. As shown, the cover may comprise two sections connected to each other by means of a hinge 40 parallel to the hinge 41 at the front edge of the tray. The rear edge of the cover is constructed with an angularly bent tab or lug 42 which extends inwardly towards the underside of the cover, so that in the open position the cover may be suspended on the front edge of the tray 38, as shown in FIG. 1 in dot-and-dash lines. The said hinging at the center of the cover 39 results in that, inter alia, it is possible to open and close the cover while the tray 38 is located inside the casing, without requiring an excessively large aperture in the front wall of the casing.

As shown in the drawings, the tie rod 30 may be composed of two pieces which are connected to each other by means of screws 43 which pass through oblong slits 44, whereby a fine adjustment of the length of the rod 30 and thereby of the associated retaining mechanism for the bottom plate 7 is possible. A resilient, telescopic joint 45 may form part of the tie rod 26, permitting a temporary extension of the rod 26 during the pivoting of the cover 21 around the hinge 22.

The period of operation of the timing device 35 may be adjustable by means of a mechanism shown in the drawings, which comprises an arm 47 which, at 48, is hingedly connected with the housing of the timing device. From the hinge 48, the arm 47 first extends forward in the direction toward the ratchet 34 with an angular portion, the apex 49 of which protrudes beyond the circumference of the wheel 36 and which thus is able to engage with the ratchet 34, cf. also FIG. 4. From the apex 49, the arm 47 extends rearwardly and terminates in an adjustment handle 50, which may extend at an angle with the arm 47 through one end wall of the casing so that it can be actuated from outside. In connection herewith, there may as shown in FIG. 1, be provided a scale 51 which is visible from outside and which indicates the duration of the operating period of the timing device.

As mentioned, FIG. 1 shows the toaster in its normal operational position, in which the compartment 4 may be completely or partly filled with bread, by way of example so-called frankfurter rolls or buns, which are comparatively small and elongated and which can be stacked on top of each other in one or several rows, depending upon the dimensions of the compartment 4. The buns thereby rest on the bottom plate 7 which is in the horizontal position shown in FIG. 1 and through the grids 5 they are exposed to radiation from the heating elements 6. While this is going on, the cover 21 is closed, as also shown in FIG. 1.

Figure 3:
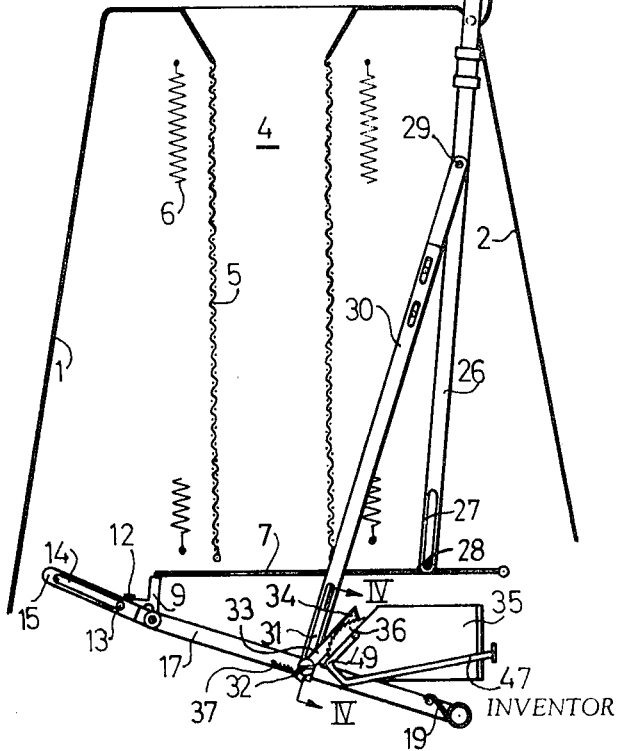
FIG. 3 is a section corresponding to FIG. 2 showing the position of the movable parts subsequent to the cover having been raised.

The cover 21 has to be raised into the position shown in FIG. 3 in order to put the buns into the compartment 4. The tie rods 26 and 30 are raised hereby and due to the engagement between the slot 31 in rod 30 and the screw 32, the tripping arm 17 is pivoted clockwise into its highest position. The arm 33 with the ratchet 34 is also raised and the spring 37 urges the ratchet 34 into engagement with the teeth on the wheel 36 when the arm 17 is in its said highest position. The engagement between the slot 27 in the tie rod 26 and the pin 28 on the bottom plate 7 ensures, furthermore, that the bottom plate, if it was not already in its highest, horizontal position beforehand, is raised into this position so that the compartment 4 is now closed at the bottom.

When the cover 21 is closed again, the engagement between the ratchet 34 and the wheel 36 has the effect that the arm 17, which via screw 32 is rigidly connected to the ratchet, remains in the position shown in FIG. 3. However, as the arm is subjected to a torque exerted by the torsion spring 19, it will subsequently move slowly downwards, that is to say counterclockwise, the speed of the movement being determined by the timing device 35. FIG. 1 illustrates an intermediate position during the pivoting movement of the arm 17. It will be seen that the pin 13 on the holding pawl 9 is situated between the ends of the slot 14 in the bar 15, so that the spring 11 still keeps the pawl 9 in abutment against the stop 12, and consequently the pawl holds the bottom plate 7 in position.

Figure 2:
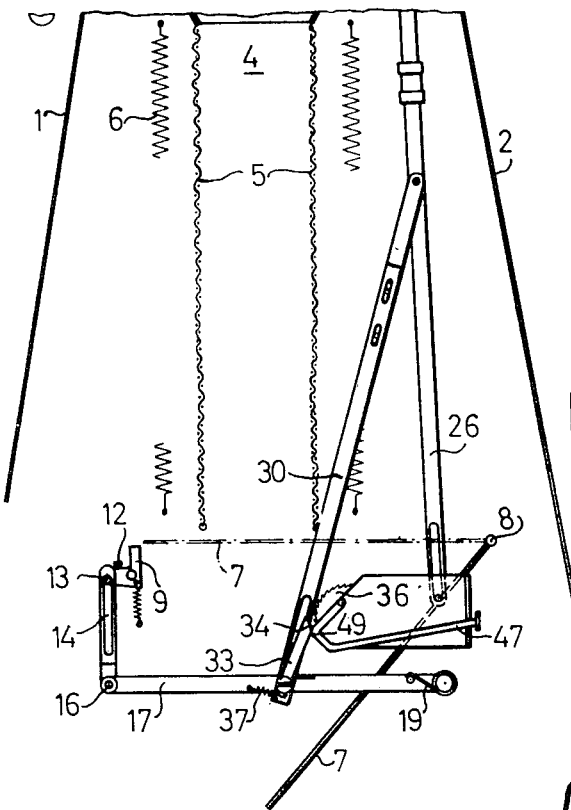
FIG. 2 is a corresponding section with the parts shown after the termination of a toasting operation, the tray and the lowermost part of the casing being omitted.

At a given moment, the ratchet 34 impinges upon the arm 47 at the apex 49 of the arm and, during the continued pivoting of the tripping arm 47 consequently forces the arm 33 with the ratchet 34 away from engagement with the wheel 36 against the force of the spring 37, when the ratchet is completely disengaged from the teeth of the wheel, noting prevents the spring 19 from urging the arm 17 downwards, whereby the topmost end of the slot 14 comes into contact with the pin 13 and thereby pivots the retaining pawl counterclockwise to release the bottom plate 7 which then is free to swing down into the position shown in full lines in FIG. 2. The duration of the said period from the closing of the cover to the releasing of the bottom plate is obviously determined by the angular position of the arm 47 relative to its pivot point 48.

When the bottom plate 7 is swung down, the buns slide down from the compartment 4 into the tray 38 along the plate, and they can be removed from the tray at once or later on, as desired. When a fresh batch of buns is to be toasted, all that is needed is to open the cover 21, whereby the tie rod 26 again raises the bottom plate 7 into a horizontal position via the slot 27 and the pin 28, while, at the same time, the tie rod 30 raises the tripping arm 17 and moves the ratchet 34 into its starting position in engagement with the wheel 36, as described above. When the tripping arm 17 is raised, the retaining pawl 9 is simultaneously freed, and under the action of its spring 11, the pawl pivot can pivot back into its operative position to hold the bottom plate 7 in position after said plate has been raised.

It will be expedient to equip the toaster with a warning lamp which lights up when the bottom plate 7 is in its horizontal position, so that during this period the operator is warned against opening the cover 21, which would start a new operating period of the timing device 35. Such a warning lamp may be connected to an electrical circuit comprising a contact actuated by the bottom plate. It is obvious that additional lamps or indicator means may be provided which, for example are able to indicate whether the heating elements 6 are switched on.

What I claim is:

1. A toaster comprising a casing including a vertical bread compartment with apertured sidewalls, heating elements disposed adjacent said sidewalls outside of said compartment, a cover hingedly connected to said casing to close the upper end of said compartment during a toasting operation, a compartment bottom hingedly connected to said casing for pivoting between a horizontal position, in which bread may be supported thereon within said compartment, and a downwardly inclined position, a pawl for holding said bottom in said horizontal position, a timing device, releasing means operatively connecting said timing device with said pawl to release the pawl when the timer has run out, tie means connecting said cover with said bottom, so that lifting of said cover causes the bottom to be lifted into its horizontal position, said tie means including a lost-motion device, and means connected to said cover for starting said timing device when said cover is lifted and reclosed.

2. A toaster as claimed in claim 1, wherein said tie means comprises a first tie rod hingedly connected to said cover, an oblong slot in said first tie rod and a pin secured to said bottom and engaging in said slot.

3. A toaster as claimed in claim 2, wherein said pawl release means comprises a tripping arm pivotally connected to said casing at one end and connected with a release lever for said pawl at its opposite end, said arm having a pin intermediate its ends, and said tie means comprises a second tie rod hingedly connected to said first tie rod and having an oblong slot, in which said pin secured to the tripping arm engages.

4. A toaster as claimed in claim 3, wherein a ratchet is carried by said tripping arm, and said timing device has an output ratchet wheel normally engaging with said ratchet.

5. A toaster as claimed in claim 4, wherein said ratchet is pivotally connected with said tripping arm, and spring means are provided for biasing said ratchet towards said ratchet wheel.

6. A toaster as claimed in claim 1 comprising means accessible from the exterior of said casing for manually adjusting the running period of said timing device.

7. A toaster as claimed in claim 1 comprising a retractable tray mounted in said casing below said compartment bottom for receiving toasted bread sliding down said bottom.

8. A toaster as claimed in claim 7, wherein said tray has a cover hingedly connected to the tray at its front edge and provided with additional hinge means intermediate its front and rear edges.

9. A toaster as claimed in claim 8, wherein a downwardly bent lug is provided at the rear edge of said tray cover for suspending the opened cover on the front edge of the tray.

* * * * *